United States Patent [19]
Khan et al.

[11] Patent Number: 5,912,787
[45] Date of Patent: Jun. 15, 1999

[54] DISK DRIVE SUSPENSION WITH MINIMUM WIRE-INDUCED BIAS

[75] Inventors: Aman Khan; Warren Coon, both of Temecula, Calif.

[73] Assignee: Magnecomp Corp., Temecula, Calif.

[21] Appl. No.: 08/756,106

[22] Filed: Nov. 25, 1996

Related U.S. Application Data

[60] Provisional application No. 60/027,682, Oct. 7, 1996, and provisional application No. 60/027,977, Oct. 8, 1996.

[51] Int. Cl.[6] .................................................. G11B 5/48
[52] U.S. Cl. .................................................. 360/104
[58] Field of Search ........................... 360/97.01, 103, 360/104

[56] References Cited

U.S. PATENT DOCUMENTS

| | | | |
|---|---|---|---|
| 3,801,388 | 4/1974 | Akiyama et al. | 216/20 |
| 3,841,905 | 10/1974 | Dixon | 216/20 |
| 4,606,788 | 8/1986 | Moran | 216/13 |
| 4,884,154 | 11/1989 | Onodera et al. | 360/104 |
| 4,991,045 | 2/1991 | Oberg | 360/104 |
| 5,006,946 | 4/1991 | Matsuzaki | 360/104 |
| 5,039,570 | 8/1991 | Sturm | 216/20 |
| 5,299,081 | 3/1994 | Hatch et al. | 360/104 |
| 5,331,489 | 7/1994 | Johnson et al. | 360/104 |
| 5,418,666 | 5/1995 | Mihara et al. | 360/97.01 |
| 5,428,489 | 6/1995 | Takamure et al. | 360/104 |
| 5,446,611 | 8/1995 | Webber | 360/104 |
| 5,491,597 | 2/1996 | Bennin et al. | 360/104 |
| 5,493,463 | 2/1996 | Hagen | 360/104 |
| 5,572,387 | 11/1996 | Brooks, Jr. et al. | 360/104 |
| 5,610,785 | 3/1997 | Aoyagi et al. | 360/104 |
| 5,805,382 | 9/1998 | Lee et al. | 360/104 |
| 5,808,836 | 9/1998 | Frater et al. | 360/104 |
| 5,818,662 | 10/1998 | Shum | 360/104 |
| 5,825,589 | 10/1998 | Khan | 360/104 |

FOREIGN PATENT DOCUMENTS

| | | | |
|---|---|---|---|
| 0599669 | 6/1994 | European Pat. Off. | 360/103 |
| 0090421 | 7/1981 | Japan | 360/104 |

*Primary Examiner*—Brian E. Miller
*Attorney, Agent, or Firm*—Louis J. Bachand

[57] ABSTRACT

Disk drive suspension in which roll and pitch biases are minimized by routing the wire bundle of oppositely twisted wire pairs in a groove extending along the longitudinal axis of the load beam, and then each of the pairs separately about the suspension flexure for connection to the head.

7 Claims, 1 Drawing Sheet

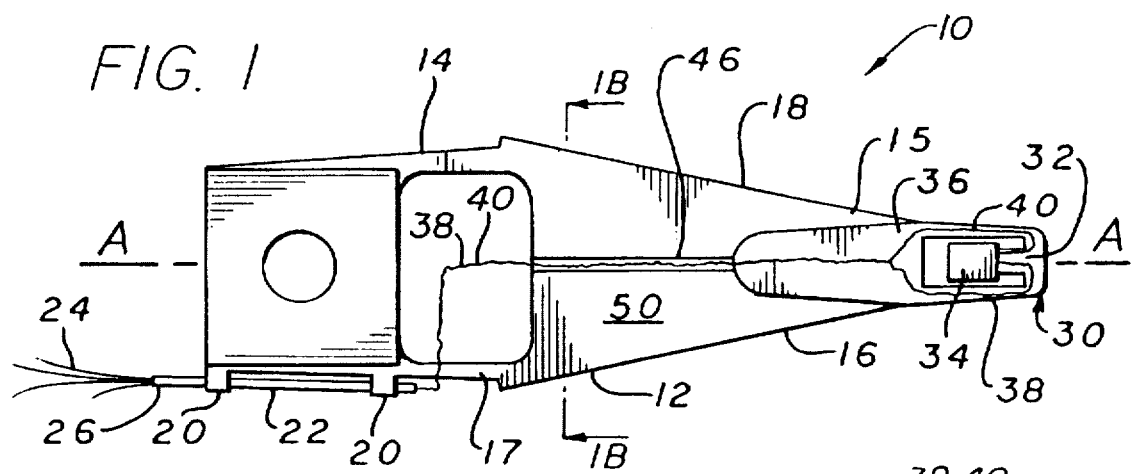
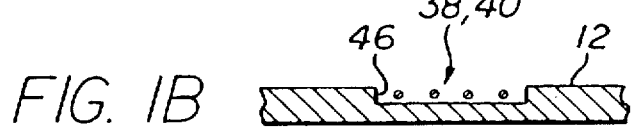
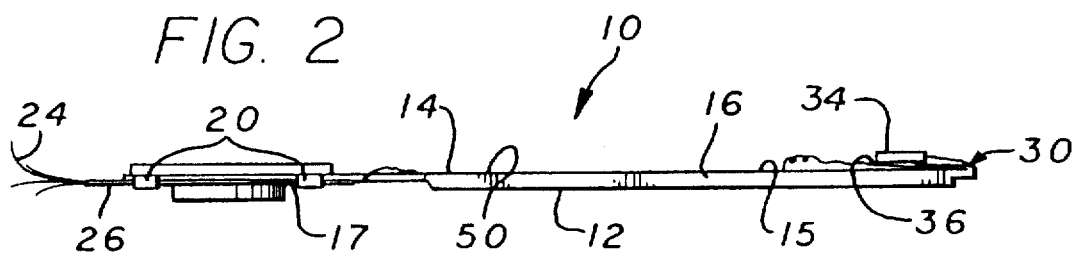
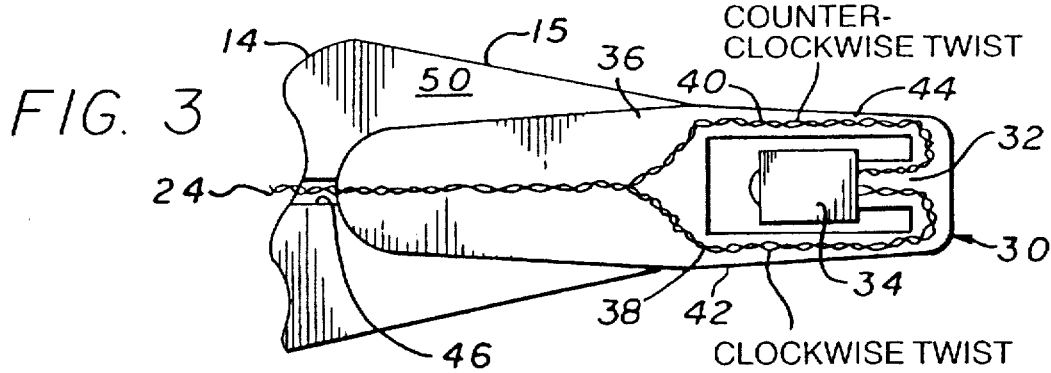
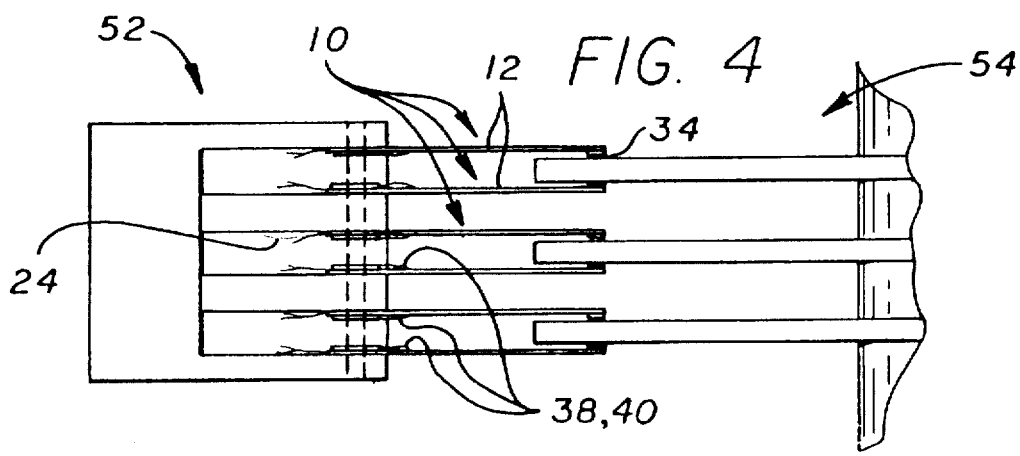

DISK DRIVE SUSPENSION WITH MINIMUM WIRE-INDUCED BIAS

REFERENCE TO RELATED APPLICATION

This application claims the benefit of provisional applications Ser. No. 60/027,682 filed Oct. 7, 1996 ABN and Ser. No. 60/027,977 filed Oct. 8, 1996 ABN.

BACKGROUND OF THE INVENTION

This invention has to do with disk drive suspensions, more particularly with improvements in load beam design and arrangements of wire bundles to minimize pitch and roll biases normally resultant from attachment of the wire bundle to the load beam.

BRIEF SUMMARY OF THE INVENTION

Reduction or elimination of bias, and of variation in bias, remains an important goal in disk drive suspension design, and all the more so as flexure supported sliders are made increasingly smaller and thus less able to tolerate unwanted externally applied torque, e.g. in pitch and roll modes. It is an object of the invention therefore to provide a novel disk drive suspension in which external torques are eliminated or minimized. It is another object to provide an improved load beam for a disk drive suspension, one in which the routing of the wire bundle is central of the load beam such that pitch biases are minimized, and within a groove locus of attachment so that the wire bundle is protected during stack assembly. It is a further object to provide a wire bundle for a disk drive suspension in which pairs of wires are twisted in opposite directions to offset and thus minimize potential roll biases. It is a further object to route wire pairs separately about the flexure and otherwise arrange components so as to avoid static attitude biases.

These and other objects of the invention are realized in a disk drive suspension comprising a load beam adapted to support along its length a wire bundle and a head gimbal assembly comprising a flexure and a head slider electrically connected to the wire bundle, the load beam defining a wire bundle attachment locus in which pitch bias from the wire bundle is minimized.

In this and like embodiments, typically, the load beam is grooved to define the locus, the load beam groove lies along the longitudinal axis of the load beam, the load beam groove is greater in depth than the wire bundle to receive the wire bundle in protective relation, the wire bundle comprises first and second pairs of wire, the pairs of wires being oppositely twisted in roll bias offsetting relation. And the individual wire pairs are passed about the flexure in separated relation.

In a further embodiment, there is provided a disk drive suspension comprising a load beam, a wire bundle supported along the load beam length, and a head gimbal assembly comprising a flexure and a head slider electrically connected to the wire bundle, the load beam having a longitudinal, axially disposed groove defining a wire bundle attachment locus in which pitch bias from the wire bundle is minimized.

In this and like embodiments, typically, the wire bundle is bonded in the load beam groove, the wire bundle comprises first and second twisted wire pairs, the pairs being oppositely twisted against inducing roll bias in the suspension, the load beam groove is sized to bodily receive the wire bundle entirely within the groove, and the wire pairs are separated beyond the groove in flexure circumscribing relation.

BRIEF DESCRIPTION OF THE DRAWINGS

The invention will be further described in conjunction with the attached drawings in which:

FIG. 1 is a plan view of the invention suspension;

FIG. 2 is a side elevation view thereof;

FIG. 3 is a fragmentary view, enlarged, of the suspension head slider and its wiring; and, FIG. 4 is a side elevation view of a head stack assembly including the invention suspensions.

DETAILED DESCRIPTION OF THE INVENTION

When a recording head slider is attached to a conventional suspension to form a head gimbal assembly, the two or four wires that connect the coil of the head transducer element to the signal processing electronics are arranged into a twisted bundle having the appearance of rope. The practices enables the wires to be fed into a small diameter sleeve that serves as an insulating and protecting containment for the wires, and also to enhance the electrical signal transmission characteristic of the wires by forming twisted pairs that reduce the reactive inductance and noise pickup which an untwisted bundle of only straight wires in proximity have.

One drawback of the twisted wire arrangement is its stiffness, which is sufficient to impart a significant torque to the slider, in pitch or roll, or both. This is referred to as static attitude bias. Even where the wire bundle is adjusted so that the torque applied to the slider is small or even zero at one position of the slider, movement of the slider in its necessary translational and rotational axes to accommodate the waviness of the disk results in applied torques beyond the one position. Ideally, the only torque applied to the slider would be that from the air bearing, and that would be in a direction and an amount just required to maintain the desired even spacing over the disk. Suspensions thus are designed to have as close to a neutral impact as possible on roll and pitch bias.

As sliders become smaller in newer designs, their ability to tolerate an externally applied torque (torque other than from the air bearing) becomes less because the slider of reduced width and length has a smaller moment arm.

The use of plastic film laminated wires, so-called flex-circuit, eliminates rotational or roll bias caused by twisted wire pairs, but pitch and roll bias may remain since the flex circuit may not always lie flat, and the completed head gimbal assembly may not be perfectly on its design datum and the may require the assembly to assume an attitude which will be resisted by the stiffness of the flex circuit.

The present invention uses two pairs of two wire bundles at the slider attachment area. These bundles are twisted in opposite directions. For example, the pair on one side of the slider is twisted clockwise and the pair on the other side is twisted counterclockwise. In this manner the twisting moment or torque applied to the slider by each pair tends to be canceled by the other pair.

As the two wire pairs leave the area of the slider and pass to the load beam portion of the suspension, the pairs of wires are routed in symmetrical fashion about the slider and then captured together in a groove in the flexure and a corresponding groove, typically etched, in the load beam. At some point down the load beam the two wire pairs or bundles are combined into a larger bundle to be fed into a relatively short sleeve which is led to perimeter tabs for support at the terminal portions of the load beam. The wire bundles are retained in the groove with bonding agents such as epoxy or urethane adhesives, preferably UV curing, or otherwise. The bundles in the groove are preferably below the surrounding surface of the load beam. This ensures that the wires remain undamaged when the completed suspension passes through the combing operation where the load beams of the completed headstack assembly are pulled up to lift them over the disk during mating of the headstack to the diskstack.

With reference now to the drawings in detail, in FIGS. 1 and 2 disk drive suspension 10 is mounted to an actuator (not shown) and comprises a load beam 12, an elongated metal member 14 which has in a forward portion 15 longitudinal edge flanges forming left and right rails 16, 18 respectively, and in a rearward portion 17 a pair of tabs 20 for supporting the wire bundle section 22, comprising wires 24 and a sleeve 26 in which the wires are held at that location. Load beam 12 carries a flexure 30 having a tongue 32 to which recording head slider 34 is attached in gimballing relation.

With reference to FIG. 3, the four wires 24 connected to slider 34 are arranged into two pairs by twisting a first two of the wires to each other into pair 38 and then the remaining two wires to each other into pair 40. One pair, e.g. pair 38 is twisted clockwise and the other, pair 40, counterclockwise. The pairs 38, 40 are mounted to the flexure 30 after first separating the pairs and forming each to lie on one side 42, or the other side 44, of the flexure. In this pattern the wire pairs 38, 40 have opposite twists and provide offsetting torques, minimizing net torque on the slider 34. The wire pairs 38, 40 are then both brought along the surface 36 of flexure 30, thence into load beam groove 46, suitably an etched groove lying on the longitudinal axis A—A of the load beam member 14. The groove 46 preferably has a depth sufficient that the two wire pairs 38, 40 when in the groove are bodily below the general plane of the surface 50 of the load beam member 14. The protection advantage of this concealment in the groove 46 of the wire pairs 38, 40 has been explained above.

With reference to FIG. 4, the suspensions 10 are usefully employed in headstack assembly 52 integrable with a diskstack assembly 54, as shown, where the wire protection advantages of the invention are usefully provided in addition to the operational advantages of the invention, including reduction or elimination of bias, and of variation in bias, even with increasingly smaller sliders which are less able to tolerate unwanted externally applied torque, e.g. in pitch and roll modes, by channeling the wire pairs centrally of the load beam, and separately about the head slider so as to avoid static attitude biases.

The foregoing objects of the invention are thus met.

What is claimed is:

1. A disk drive suspension comprising a wire bundle, a load beam having a wire bundle attachment locus and supporting along its length said wire bundle, and a head gimbal assembly comprising a flexure and a slider electrically connected to said wire bundle, said load beam being adapted to support said head gimbal assembly, said wire bundle comprising oppositely twisted first and second separable pairs of wires twisted together about each other along a common axis, said load beam having a groove lying along the load beam longitudinal axis, said groove defining said wire bundle attachment locus in which pitch bias from said wire bundle is minimized.

2. The disk drive suspension according to claim 1, in which said load beam groove is greater in depth than said wire bundle to protect said wire bundle.

3. The disk drive suspension according to claim 1, in which each of said first and second twisted-together wire pairs is separately passed about said flexure.

4. A disk drive suspension comprising a load beam having a wire bundle attachment locust, a wire bundle supported along the load beam length at said wire bundle attachment locus, and a head gimbal assembly comprising a flexure and a slider electrically connected to said wire bundle, said wire bundle comprising oppositely twisted first and second separable pairs of wires twisted together about each other along a common axis against inducing roll bias in said wire bundle, said load beam having a longitudinal, axially disposed groove defining said wire bundle attachment locus.

5. The disk drive suspension according to claim 4, in which said wire bundle is bonded in said load beam groove.

6. The disk drive suspension according to claim 5, in which said load beam groove is sized to bodily receive said wire bundle entirely within said groove.

7. The disk drive suspension according to claim 6, in which said flexure has left and right lateral portions, said first and second twisted together wire pairs being separated from each other beyond said groove and each separated pair routed laterally of said left or right flexure lateral portions.

* * * * *